Jan. 1, 1924
C. T. EVANS
MOTOR CONTROLLER
Filed March 17, 1919 2 Sheets-Sheet 1
1,479,033
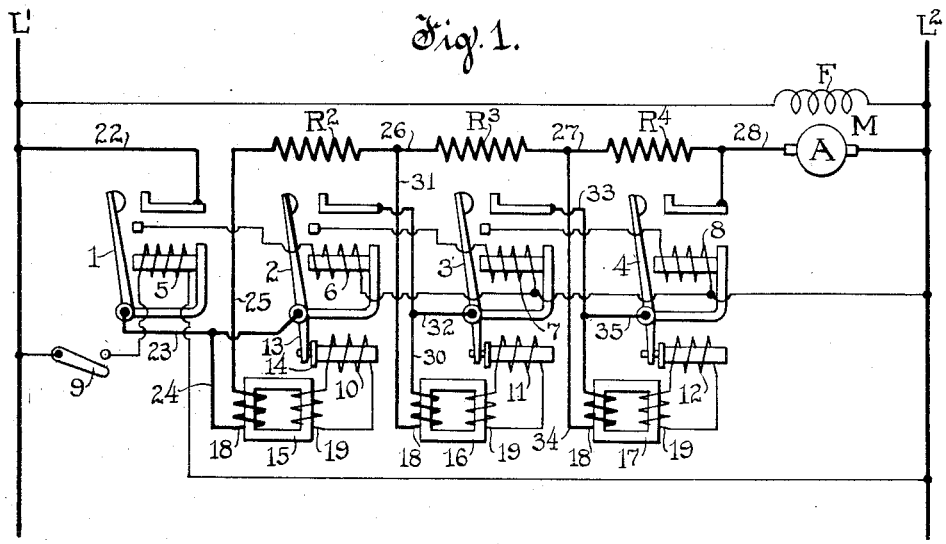
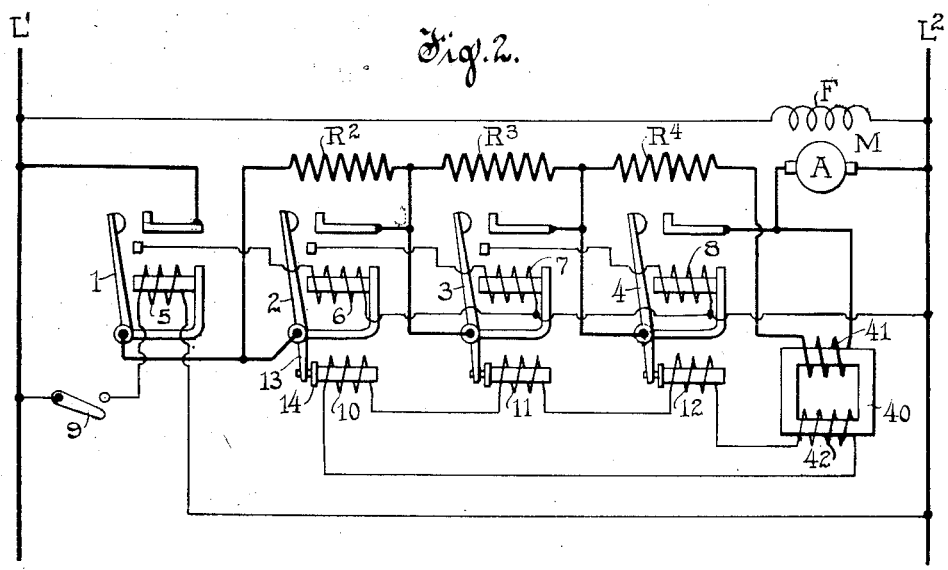
INVENTOR.
Clarence T. Evans
BY
ATTORNEYS.

Jan. 1, 1924
C. T. EVANS
1,479,033
MOTOR CONTROLLER
Filed March 17, 1919
2 Sheets-Sheet 2
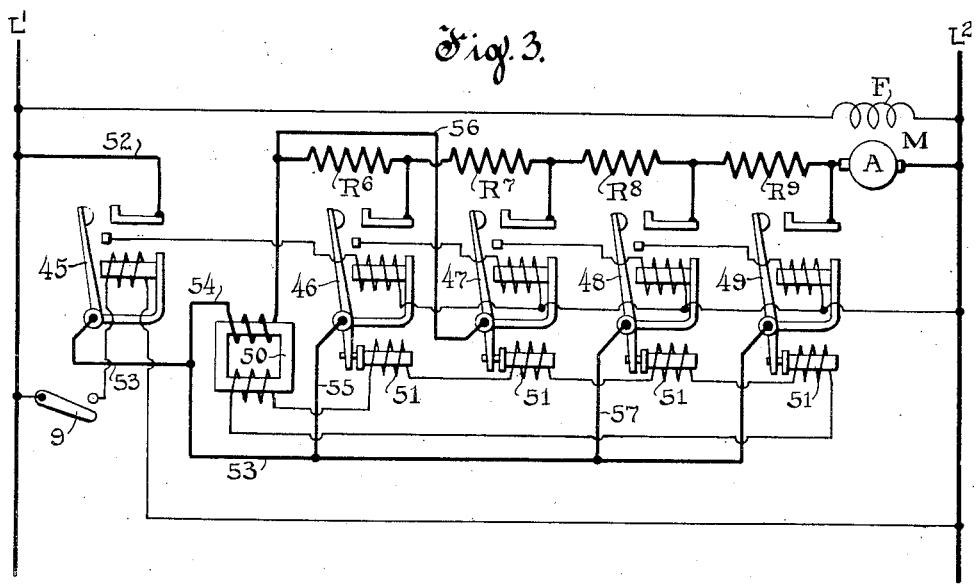
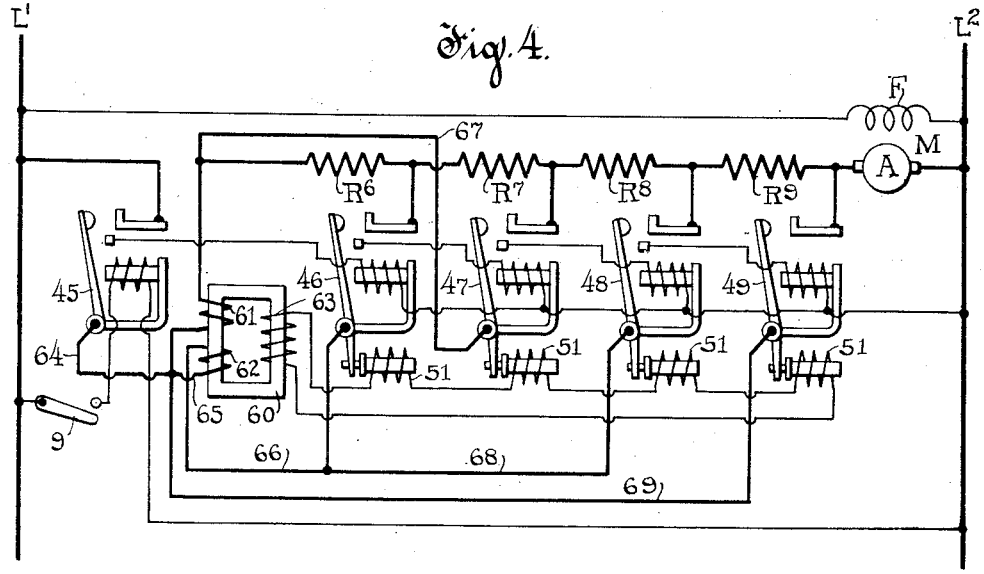
INVENTOR.
Clarence T. Evans
BY Frank Hubbard
ATTORNEYS.

Patented Jan. 1, 1924.

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed March 17, 1919. Serial No. 283,067.

*To all whom it may concern:*

Be it known that I, CLARENCE T. EVANS, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to controllers for electric motors and more particularly direct current motors.

In practice there are numerous instances, as in elevator service, where, in order to obtain gradual starting of the motor driven apparatus and to protect the driving motor against excessive surges of current, it is necessary to provide the motor with a controller having a delayed accelerating operation. Heretofore it has been common practice to provide controllers for such service with means responsive to the motor current to check accelerating operation thereof under given current conditions, but such means sometimes prevent ultimate full accelerating operation which in elevator service, for example, is objectionable. Also, controllers have been provided wherein the switches thereof have been retarded by dash-pots or the like to insure a definitely delayed accelerating operation but such controllers are open to other objections.

The present invention has among its objects to provide a simple, efficient and reliable controller embodying means free from the aforesaid objections, to insure delayed accelerating operation thereof.

A further object is to provide a controller of the aforesaid character subject to control, to a limited extent, by the value of the current in the motor circuit, for additional protection of the motor when heavily loaded.

Various other objects and advantages of the invention will hereinafter appear.

The accompanying drawing diagrammatically illustrates certain embodiments of the invention and the same will now be described, it being understood that the invention is susceptible of modifications in other forms falling within the scope of the appended claims.

In the drawing,

Figure 1 shows a controller having a plurality of electromagnetic accelerating switches and independent control means therefor to delay response thereof;

Fig. 2 shows a modified controller wherein the accelerating switches are subjected to the influence of a common control device; and, Figs. 3 and 4 show modifications of the controller shown in Fig. 2.

Referring to Fig. 1, the controller includes an electromagnetic main switch 1, electromagnetic accelerating switches 2, 3 and 4, switch 1 being employed to control the continuity of the armature circuit of shunt motor M and switches 2, 3 and 4 to control starting resistances $R^2$, $R^3$ and $R^4$ connected in series with the motor armature. The aforesaid switches are provided with shunt operating windings 5, 6, 7 and 8 respectively, the winding 5 of switch 1 being controllable by a manual switch 9 and the windings 6, 7 and 8 being controlled by auxiliary contacts of switches 1, 2 and 3 respectively in a well known manner to provide for operation of all of said switches sequentially in the order of their reference numerals.

The switches 2, 3 and 4, which in practice may assume various different forms, are illustrated as respectively provided with lockout windings 10, 11 and 12, each of said switches having an armature extension 13 carrying an adjustable magnetic plug 14 disposed within the magnetic field of its respective lockout winding. Thus the windings 10, 11 and 12 afford means for delaying closure of the accelerating switches 2, 3 and 4 respectively but only so long as said windings are supplied with a given current. As illustrated in this figure, the windings 10, 11 and 12 are respectively supplied with current by transformers 15, 16 and 17, it being understood that other means for supplying transient currents as hereinafter set forth, might be substituted for such transformers. Each of the transformers is provided with a primary winding 18 to be included in series with the motor armature and a secondary winding 19 to supply current to its respective lockout winding.

The circuit arrangement is such that closure of switch 1 completes circuit from line L' by conductor 22 through said switch, by conductors 23 and 24 through the primary winding of transformer 15, by conductor 25 through resistance $R^2$, by conductor 26 through resistance $R^3$, by conductor 27 through resistance $R^4$, by conductor 28 through the armature A of the motor to line $L^2$, the field of said motor being directly connected between lines $L'$ and $L^2$. Under such conditions the transformers 16 and 17 are disconnected from circuit but upon closure of switch 2 the motor circuit extends from switch 1 by conductor 23 through switch 2, by conductor 30 through the primary winding of transformer 16, by conductor 31 to conductor 26 and thence through resistances $R^3$ and $R^4$ to the motor armature. This short circuits the resistance $R^2$ and the transformer 15 and upon closure of switch 3 the motor circuit extends from switch 2 by conductors 30 and 32 through switch 3, by conductor 33 through the primary winding of transformer 17, by conductor 34 to conductor 27 and thence through resistance $R^4$ to the motor armature. This short circuits resistance $R^3$ and the transformer 16 and upon closure of switch 4 the motor circuit extends from switch 3 by conductors 33 and 35 through switch 4 directly to the motor armature, thus short-circuiting resistance $R^4$ and the transformer 17.

Thus upon initial closure of the motor circuit the primary winding of transformer 15 is subjected to the armature current and the rise in armature current from zero value causes said transformer to induce a transient current in the circuit of lockout winding 10 of switch 2. Similarly upon closure of switches 2 and 3 the transformers 16 and 17 are successively subjected to currents rising from zero value whereby they also function to supply transient currents to the lockout windings of their respective switches. The secondary current thus supplied to each lockout winding has a time constant determined by the design of the transformer and its connected circuits and a rising current in the primary of each transformer tends to prolong the secondary current while a decreasing primary current has a reverse tendency. Hence by proper design of the transformers and their connected circuits the response of each accelerating switch may be delayed for an appreciable time augmented by the inherent time element of such switch and regulable by adjustment of the air gap between the plug 14 and the core of the lockout winding. Further, by proper design and adjustments each switch may be insured a given minimum delay when the rise in motor current is within a given limit and an increased delay when the motor current exceeds such limit and yet without danger of preventing response of said switches within a given maximum time, regardless of the subsequent values of the motor current.

Referring to Fig. 2, the controller shown therein differs from that shown in Fig. 1 only in that the lockout windings 10, 11 and 12 are connected in series to be supplied with current by a single transformer 40 employed in lieu of the transformers 15, 16 and 17. The transformer 40 has a primary winding 41 connected in series with the motor armature at a point between resistance $R^4$ and switch 4 and with a secondary winding 42 to supply current to the series connected lockout windings. Thus the primary winding of the transformer is subjected to a rising current upon closure of switch 1 and also upon exclusion of each step of resistance whereby said transformer supplies a transient current to all of the lockout windings immediately upon closure of each switch with substantially the same results as are obtained with the several transformers shown in Fig. 1.

Referring to Fig. 3, the controller shown therein is very similar to that shown in Fig. 2 but is provided with an additional accelerating switch and resistance section controlled thereby. Further, it is provided with modified motor connections and to avoid confusion, the elements and connection of this controller, are given other reference characters. This controller comprises an electromagnetic main switch 45 and four accelerating switches 46, 47, 48 and 49 controlling resistance sections $R^6$, $R^7$, $R^8$ and $R^9$ respectively. The switches 46 to 49 are of the same type as the switches 2 to 4 (Figs. 1 and 2) and said switches together with the main switch, are controllable in the same manner as in Figs. 1 and 2. Also, this controller includes a single transformer 50 to supply current to the lockout windings 51 of the switches 46 to 49 which windings are connected in series as in Fig. 2. In this instance, however, the primary winding of the transformer is connected in the armature circuit between switch 45 and the first resistance section $R^6$ and the circuit connections for the motor are such that the primary winding of the transformer is subjected to the motor current upon closure of the main switch, then short-circuited upon closure of switch 46, then reincluded in the motor circuit upon closure of switch 47 and finally short-circuited upon closure of switch 48. More specifically, closure of switch 45 completes circuit from line $L'$ by conductor 52 through said switch, by conductors 53 and 54 through the primary winding of transformer 50 and thence through the resistances $R^6$, $R^7$, $R^8$ and $R^9$ and motor armature to line $L^2$. On the other hand, upon closure of switch 46 circuit is completed from line $L'$ through switch 45, by conductors 53 and 55 through switch 46 to a point between resistance sections $R^6$ and $R^7$ whereby the primary winding of the transformer and resistance section $R^6$ are short-circuited. Then upon closure of switch 47 circuit is completed from line $L'$ through switch 45, by conductors 53 and 54 through the primary winding of transformer 50, by conductor 56 to and through the switch 47 to a point between resistance sections $R^7$ and $R^8$, thereby reincluding in the motor circuit the primary winding of the transformer while excluding resistance $R^7$. Then upon closure of switch 48 circuit is completed from line L' through switch 45, by conductors 53 and 57 through switch 48 to a point between resistance sections $R^8$ and $R^9$, whereby the primary winding of the transformer is again short circuited, together with the resistance $R^8$. Finally upon closure of switch 49 circuit is completed from line L' through switch 45 by conductor 53 and through switch 49 to a point between resistance section $R^9$ and the motor armature thereby connecting the motor directly across the line.

Thus upon closure of the main switch 45 and also upon closure of switch 47, the primary winding of the transformer is subjected to surges of the armature current for inducing transient currents in the circuit of the lockout windings 51, which currents provide for delaying response of switches 46 and 48. On the other hand, when the primary winding of the transformer is short circuited by closure of switch 46 and later by closure of switch 48, the reduction in the current traversing said winding causes the same to again induce a transient current in the circuit of the lockout windings to delay closure of switches 47 and 49. In other words, the transformer functions in response to rising currents to energize the lockout coils for delaying response of switches 46 and 48 and to falling currents to energize said lockout windings for delaying response of switches 47 and 49.

Referring to Fig. 4, the controller comprises a main switch, accelerating switches and resistances like those shown in Fig. 3, and designated by the same reference characters. Also, as in Fig. 3, the lockout windings 51 of switches 46 to 49 are connected in series to be supplied with current from a single transformer 60 but in this instance the transformer is of a modified type being provided with two oppositely wound primary windings 61 and 62 and a secondary winding 63. Also, in this instance, the motor connections are so modified as to provide for inclusion of the windings 61 and 62 alternately in the motor circuit. More specifically closure of switch 45 completes circuit from line L' through said switch, by conductor 64 through transformer winding 61 and thence through resistance sections $R^6$, $R^7$, $R^8$ and $R^9$ to and through the motor armature to line $L^2$. Then upon closure of switch 46 circuit is completed from line L' through switch 45, by conductors 64 and 65 through transformer winding 62 by conductor 66 to and through switch 46 to a point between resistance sections $R^6$ and $R^7$, thereby short circuiting transformer winding 61 together with resistance $R^6$ while including transformer winding 62 in series with the motor. Then upon closure of switch 47 circuit is completed from line L' through switch 45, by conductor 64 through transformer winding 61, by conductor 67 to and through switch 47 to a point between resistance sections $R^7$ and $R^8$ thereby short circuiting transformer winding 62 together with resistance $R^7$ while reincluding in the armature circuit transformer winding 61. Then upon closure of switch 48 circuit is completed from line L' through switch 45 and transformer winding 62 by conductors 66 and 68 to and through switch 48 to a point between resistance sections $R^8$ and $R^9$ thereby again short circuiting transformer winding 61 together with resistance $R^8$ while reincluding in the armature circuit the transformer winding 62. Finally upon closure of switch 49 circuit is completed through switch 45 by conductors 64 and 69 to and through switch 49 to a point between resistance section $R^9$ and the armature, whereby the motor is connected directly across the line.

Thus the transformer winding 61 is utilized to induce current in the lockout circuit of the switches for delaying response of switches 46 and 48 while transformer winding 62 is included in the motor circuit to induce current in the lockout circuit for delaying response of switches 47 and 49. Further, since the primary windings of the transformer are oppositely wound and each is short circuited through a resistance when the other is included in circuit, the effect on the secondary winding is substantially the same as though a single primary winding were subjected to a current changing from negative to a positive value.

What I claim as new and desire to secure by Letters Patent is:

1. In a motor controller, in combination, resistance varying means and means to effect arrest of the action of the former means in different stages thereof, the latter means having an inherently transient effect influenced by the electrical condition of the motor circuit and including means providing for differentiation of the conditions under which the action of the first mentioned means is arrested in different stages thereof.

2. In a motor controller, in combination, circuit commutating means and electroresponsive means to arrest the commutating action of the former means in different stages thereof, said electroresponsive means including inductive means rendering the same responsive to a varying current with an inherently transient effect and also including means rendering its arresting actions in different stages of circuit commutation determinable individually.

3. In a motor controller, in combination, accelerating means and means having an inherently transient effect to arrest accelerating operation of the former means in different stages thereof subject to control by the electrical condition of the motor circuit, the second mentioned means including means rendering the arresting actions thereof in different stages of acceleration variable relatively.

4. In a motor controller, in combination, accelerating means and electroresponsive means to arrest the accelerating action of the former means in different stages thereof, said electroresponsive means including inductive means rendering the same responsive with an inherently transient effect to current variations including variations in the motor current and said electroresponsive means also including means providing for differentiation of the electrical conditions under which the same arrests the accelerating action of the first mentioned means in different stages thereof.

5. In a motor controller, in combination, resistance varying means and means to arrest the resistance varying action of the former means in different stages thereof, the latter means including a plurality of windings to function sequentially as the action of the first mentioned means progresses and means to supply said windings with an induced current as a function of certain direct current variations.

6. In a motor controller, in combination, resistance varying means and means to arrest the resistance varying action of the former means in different stages thereof, the latter means including a plurality of windings to function sequentially as the action of the first mentioned means progresses and means to supply said windings with an induced current as a function of certain direct current variations, including variations in the motor current.

7. In a motor controller, in combination, accelerating means and means to arrest the accelerating action thereof, the latter means including means to supply an induced current as a function of certain direct current variations and an electromagnet responsive to such induced current and having an armature normally positioned for arrest of the accelerating action of the first-mentioned means.

8. In a motor controller, in combination, resistance varying means and means to arrest the resistance varying action of the former means in different stages thereof in response to the surges in current incident to resistance variation, the second mentioned means including means subjected to other current variations as the operation of the first mentioned means progresses to render the second mentioned means effective for given minimum periods to be prolonged by said surges in current.

9. In a motor controller, in combination, accelerating means and means to arrest the accelerating action of the former means in response to a varying current and to current variations to which the controlled motor is not subjected, the second mentioned means including inductive means rendering the same so responsive with an inherently transient effect.

10. In a motor controller, in combination, accelerating means and means to arrest the accelerating action of the former means in response to a varying current, the second mentioned means including inductive means rendering the same so responsive with an inherently transient effect and connections rendering the second mentioned means responsive to the surges in motor current incident to acceleration in addition to current variations to which the motor is not subjected.

11. In a motor controller, in combination, accelerating means and electroresponsive means to arrest the accelerating action of the former means in different stages thereof, said electroresponsive means having connections commutatable by said accelerating means as the accelerating action thereof progresses and having inductive means rendering the same responsive, with an inherently transient effect, to the current variations caused by commutation of said connections.

12. In a motor controller, in combination, resistance varying means and means to arrest the resistance varying action of the former means in different stages thereof, the latter means being responsive to a varying current with an inherently transient action and including means whereby in the different stages of resistance variation it is subjected to the influence of the surges in motor current incident thereto and also to other variations in current providing for a given minimum transient effect thereof.

13. In a motor controller, in combination, resistance varying means and means to arrest the resistance varying action of the former means, the latter means including a winding requiring energization for arrest of the accelerating action, a winding arranged in an inductive relation therewith and connections for the latter winding subjecting the same to a varying current and to current variations to which the controlled motor is not subjected.

14. In a motor controller, in combination, accelerating means and means to arrest the accelerating action of the former means, the latter means including a winding requiring energization for arrest of the accelerating action, a winding arranged in an inductive relation therewith and connections for the latter winding subjecting the same to surges in motor current incident to acceleration and also to current variations to which the controlled motor is not subjected.

15. In a motor controller, in combination, an electro-responsive switch having a winding to restrain the same against response and a transformer to supply said restraining winding with a transient current as a function of current variation to which the primary winding of said transformer is subjected.

16. In a motor controller, in combination, accelerating means including an electroresponsive switch having a winding to restrain the same against response and a transformer to supply said restraining winding with a transient current, said transformer having its primary winding subjected to influence by variation of motor current.

17. In a motor controller, in combination, accelerating means including an electroresponsive switch having a winding to restrain the same against response and a transformer to supply said restraining winding with a transient current, said transformer having connections subjecting its primary winding to influence by variation of the motor current incident to acceleration and also to influence by other current variations incident to commutation of its connections.

18. In a motor controller in combination, an electroresponsive switch having a winding to restrain the same against response and means to supply said restraining winding with a transient current preceding response of said switch and also upon release thereof.

19. In a motor controller, in combination, resistance varying means including an electro-responsive switch having a winding to restrain the same against response and a transformer to supply said restraining winding with a transient current, said transformer having connections to cause the same to so function preceding response of said switch and also upon release thereof.

20. In a motor controller, in combination, accelerating means including an electro-responsive switch having a winding to restrain the same against response and a transformer to supply said restraining winding with a transient current, said transformer having connections subjecting its primary winding to the motor current whereby said transformer so functions with respect to said restraining winding prior to accelerating operation of said switch and also upon decelerating operation thereof.

21. In a motor controller, in combination, resistance varying means and means to arrest the resistance varying action thereof in different stages, the latter means including a transformer to cause same to so act as a function of a varying current and said transformer having oppositely wound primary coils to be subjected alternately to the controlling current.

22. In a motor controller, in combination, accelerating means and means to arrest the accelerating action thereof in different stages, the latter means including a transformer to cause the same to so act as a function of current variations to which the primary of said transformer is subjected and said transformer having oppositely wound coils subjected alternately to the motor current.

23. In a motor controller, in combination, resistance varying means and means to arrest the resistance varying action thereof in different stages, the latter means including a transformer to cause the same to so act as a function of current variations to which the primary of said transformer is subjected and said transformer having oppositely wound coils and commutatable connections whereby said windings are connected alternately in series with the motor, each being shunted when the other is so connected.

24. In a motor controller, in combination, resistance varying means and means to arrest the resistance varying action thereof in different stages, the latter means including a transformer to cause the same to so act as a function of current variations to which the primary of said transformer is subjected and said transformer having oppositely wound coils and commutatable connections whereby said windings are connected alternately in series with the motor, each being shunted when the other is so connected and both being shunted upon completion of the resistance variations.

In witness whereof, I have hereunto subscribed my name.

CLARENCE T. EVANS.